(12) United States Patent
Hadler et al.

(10) Patent No.: US 6,702,208 B1
(45) Date of Patent: Mar. 9, 2004

(54) HOPPER SPREADER APPARATUS FOR DRY, FREE FLOW MATERIALS

(75) Inventors: Howard D. Hadler, West Bend, WI (US); Lynn W. Schultz, Campbellsport, WI (US); Terry C. Wendorff, Cedarburg, WI (US)

(73) Assignee: Sno-Way International, Inc., Hartford, WI (US)

( * ) Notice: Subject to any disclaimer, the term of this patent is extended or adjusted under 35 U.S.C. 154(b) by 0 days.

(21) Appl. No.: 10/192,410

(22) Filed: Jul. 10, 2002

(51) Int. Cl.$^7$ ............................................... A01C 17/00
(52) U.S. Cl. ..................... 239/668; 239/681; 239/670; 239/650
(58) Field of Search .................... 239/681, 668, 239/651, 659, 669, 670, 679, 684, 650, 687; 222/185.1, 181.1, 504

(56) References Cited

U.S. PATENT DOCUMENTS

| | | | | |
|---|---|---|---|---|
| 3,703,260 A | * | 11/1972 | Grabske | 239/666 |
| 3,760,933 A | * | 9/1973 | Maldeis et al. | 239/650 |
| 3,790,090 A | * | 2/1974 | Lorenc et al. | 239/666 |
| 4,381,699 A | * | 5/1983 | Haussler | 91/433 |
| 4,712,717 A | * | 12/1987 | Egerdahl | 239/661 |
| 4,809,449 A | | 3/1989 | Solaja | |
| 5,096,125 A | * | 3/1992 | Wise et al. | 239/675 |
| 5,375,773 A | | 12/1994 | Lewis | |
| 5,528,216 A | * | 6/1996 | Main | 340/426.33 |
| 5,692,875 A | * | 12/1997 | Boman | 414/725 |
| 5,755,387 A | | 5/1998 | Hedrick | |
| 5,947,391 A | * | 9/1999 | Beck et al. | 239/677 |
| 5,988,534 A | | 11/1999 | Kost et al. | |
| 6,035,944 A | | 3/2000 | Neuner et al. | |
| 6,089,478 A | * | 7/2000 | Truan et al. | 239/675 |
| 6,173,904 B1 | * | 1/2001 | Doherty et al. | 239/1 |
| 6,220,532 B1 | * | 4/2001 | Manon et al. | 239/672 |
| 6,382,330 B2 | * | 5/2002 | Bischel et al. | 175/24 |

OTHER PUBLICATIONS

"Spreadator", SNO–WAY International, Inc. Sales Brochure, four pages, 2001.
"Electrically Adjustable Proportional Pressure Compensated Flow Control" Brand Hydraulics, Specification Sheet, one page, Aug. 23, 1999.
"Full Range Flow Control, F–C Series", Brand Hydraulics, Specification Sheet, one page, prior to Aug. 29, 2001.
Internet Document: Product Catalog, Brand Hdraulics, website http: www.brandhyd.com/fchigh/hchigh–iunfo.htm (Oct. 25, 2001), three pages.

* cited by examiner

*Primary Examiner*—Henry Bennett
*Assistant Examiner*—Amanda Flynn
(74) *Attorney, Agent, or Firm*—Reinhart, Boerner, Van Deuren s.c.

(57) ABSTRACT

A hopper spreader apparatus for spreading materials such as salt, sand or seed includes a motor for rotating a spinner for distributing particulate matter delivered to the spinner. The hopper spreader apparatus is adapted for mounting on a skid steer loader unit. In one embodiment, the drive motor is a hydraulic motor which obtains hydraulic power from the hydraulic system of the skid steer loader unit. A flow controller adapts the flow rate provided by the skid steer loader unit to the flow rate for the hydraulic motor. In one embodiment, a check valve limits the operation of the hydraulic motor to one direction. The hopper spreader apparatus includes a quick release mounting adapter for quickly mounting the hopper spreader apparatus to the skid steer loader unit.

27 Claims, 7 Drawing Sheets

HOPPER SPREADER APPARATUS FOR DRY, FREE FLOW MATERIALS

BACKGROUND OF THE INVENTION

This invention relates to a spreader apparatus for spreading dry, free flow materials, and more particularly, to a combination hopper and spreader unit including a mounting assembly for mounting the combined hopper and spreader unit on a front end loader-type vehicle.

The spreading of salt and/or sand is a requirement in many areas for maintaining roads and driveways during the winter months. Various types of spreader units have been developed for spreading dry, free flow materials, such as salt and sand. Many salt spreader units have been designed for mounting on vehicles such as pick-up trucks, because of the availability of pick-up trucks to those who are involved in road and driveway maintenance.

Because salt spreader units are not used year round, the salt spreader units are removably mounted on the pick-up truck. Typically, the spreader unit is mounted on the rear of the pick-up truck using a frame which slides over or is otherwise secured to the tailgate back of the vehicle and is supported on the bumper of the vehicle. One problem associated with mounting a spreader unit on the rear of a pick-up truck is accessing of the vehicle's cargo bed via the tailgate. Various attempts have been made to improve mounting of such spreader units, including the development of swing-out mounting assemblies. Problems with swing-out spreader units include damage to the salt spreader unit and/or the vehicle when a loaded salt spreader unit is pivoted. Other considerations include the time that is required to install a spreader unit on a vehicle and the damage done to the vehicle when the spreader unit is installed.

One known type of spreader unit includes a hopper having a discharge outlet near the bottom of the hopper through which the particulate material, such as salt, falls onto a spinner. Typically, the spinner is mounted on a drive shaft which is rotated by an electric motor, the speed of which is controllable by the driver of the vehicle to change the range over which the particulate material is distributed. However, if for any reason the drive shaft should become jammed while the motor remains energized, this can result in damage to the motor or other components of the drive assembly of the spreader unit.

SUMMARY OF THE INVENTION

The present invention provides a hopper spreader apparatus for dispensing dry, free flow material. The hopper spreader apparatus includes a hopper for containing the dry, free flow material and a spinner located adjacent a discharge outlet of the hopper for spreading free flow material discharged from the hopper. The spinner is rotated by a drive mechanism including a hydraulic motor, the shaft of which is coupled to the spinner. The operation of the motor is controlled by a hydraulic circuit which includes a hydraulic flow controller which adapts the flow rate of hydraulic fluid supplied by the hydraulic system to the hydraulic fluid flow rate for the hydraulic motor. The hydraulic flow controller includes a flow control device which is adjustable for varying the flow rate of hydraulic fluid supplied to the hydraulic motor, thereby varying the operating speed of the hydraulic motor. The hydraulic motor can be operated bi-directionally or in one direction only. In one embodiment, the hydraulic circuit includes a check valve for limiting the hydraulic motor to uni-directional operation.

Further in accordance with the invention, there is provided a hopper spreader apparatus which is adapted for mounting to a front end loader type vehicle, such as a skid steer loader unit, which includes a mounting plate movably supported at the front of the vehicle. The hopper spreader apparatus includes a hopper for containing dry, free flow material and a spinner located adjacent a discharge outlet of the hopper and rotated by a motor for spreading free flow material discharged from the hopper. The hopper spreader apparatus further includes a mounting assembly which is adapted for removably attaching the hopper to the mounting plate of the vehicle. In one embodiment, the mounting assembly includes a support frame supporting the hopper and a mounting adapter for removably coupling the support frame to the mounting plate of the vehicle.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DETAILED DESCRIPTION OF THE PREFERRED EMBODIMENTS

Figure 1:
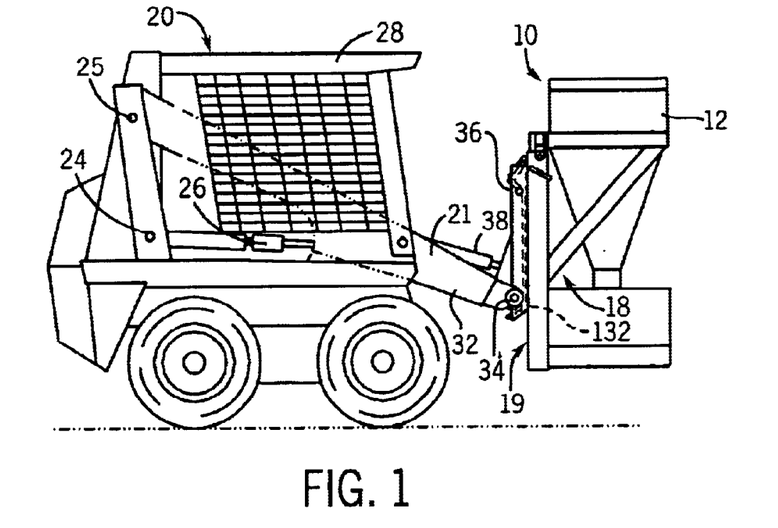
FIG. 1 is a side view of a hopper spreader apparatus in accordance with the invention shown mounted to a skid steer loader unit.
Figure 2:
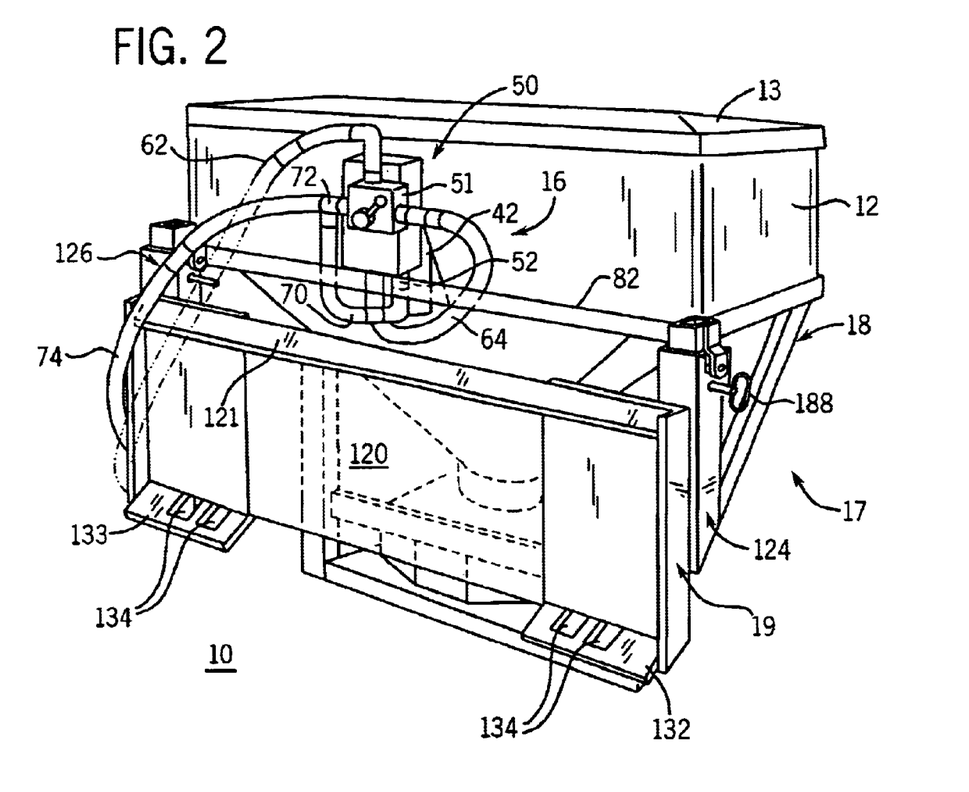
FIG. 2 is a rear perspective view of the hopper spreader apparatus of FIG. 1.
Figure 3:
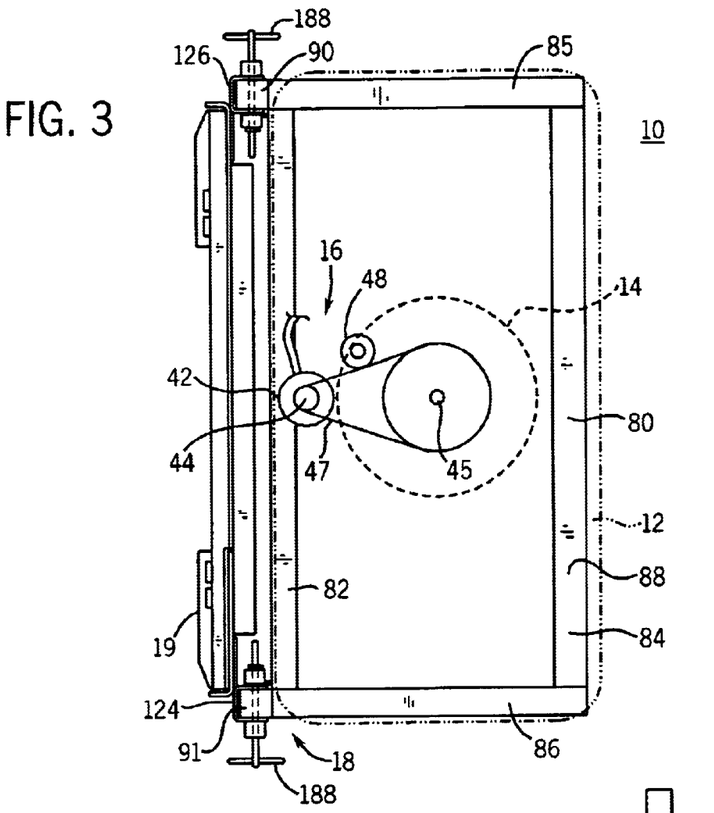
FIG. 3 is a top plan view of the hopper spreader apparatus of FIG. 1, with the cover removed, illustrating the drive mechanism.

Referring to FIGS. 1–3 of the drawings, there is shown a hopper spreader apparatus 10 provided by the present invention. The hopper spreader apparatus 10 is described with reference to an application for spreading dry, free flow material, such as salt, sand, and the like onto a surface being traveled by a vehicle to which the hopper spreader apparatus 10 is mounted. However, the hopper spreader apparatus 10 can be used for spreading other particulate materials such as seed, fertilizer, or any other free flowing material.

The hopper spreader apparatus 10 includes a hopper 12 for containing the dry, free flow material to be spread, and a spinner 14 (FIG. 3) which is rotated by a drive assembly 16 for spreading the dry free flow material being discharged from the hopper. The hopper 12, the spinner 14 and the drive assembly 16 are supported by a frame assembly 17 which includes a support frame 18 and a mounting adapter 19 which facilitates removable mounting of the hopper spreader apparatus 10 to a vehicle.

In accordance with one aspect of the invention, the hopper spreader apparatus 10 is adapted for mounting on a vehicle, such as a skid steer loader unit 20, which has a vertical lift mechanism which includes lift arms extending forwardly of the vehicle. However, the hopper spreader apparatus 10 can be used on other vehicles such as highway trucks, pick-up trucks, and the like, when the particulate material is salt or sand and the like. However, the hopper spreader apparatus 10 can be used on other vehicles such as tractors or farm wagons, for example, when particulate material to be spread is seed or fertilizer and the like.

The skid steer loader unit 20 includes a pair of forwardly projecting loader arms, such as loader arm 21, which extend in a parallel, spaced relationship. The loader arms are pivoted near the rear of the skid steer loader unit and can be actuated about pivot points, such as pivot points 24 and 25 for loader arm 21, by hydraulic cylinders, such as hydraulic cylinder 26 for loader arm 21, the operation of which can be controlled from the cab 28 of the skid steer loader unit 20. The forward ends 32 of the loader arms include a horizontal pivot 34 on which is mounted a mounting plate 36, commonly referred to as an attachment tool carrier plate. Typically, a loader bucket is mounted on the tool carrier plate 36. The pitch of the tool carrier plate 36 and an implement mounted thereon is controlled by a hydraulic actuator 38. The mounting adapter 19 mounts the hopper spreader apparatus 10 to the mounting plate 36 of the skid steer loader unit 20 as will be described.

Considering the hopper spreader apparatus 10 in more detail, the hopper 12 is generally funnel shaped and includes a removable top 13 for filling of the hopper 12 with particulate material to be spread. The hopper 12 has a discharge outlet 40 (FIG. 8) near its lower end. The material contained within the hopper 12 is fed by gravity to the discharge outlet 40 which can include flow control gating as is known. The hopper 12 and the flow control gating can be made of a rigid plastic material, such as polyethylene and the like.

The spinner 14 is spun by the drive assembly 16 to spread the particulate material over a wide distribution area. By rotating the spinner 14 as the particulate material is being delivered to the spinner 14, the particulate material is centrifugally propelled by the spinner in a wide pattern onto the ground surface on which the vehicle 20 is moving. Flow path adjustment plates can be mounted adjacent to the spinner 14 to provide width and/or range adjustment, and flow rate adjustment can be provided by controlling an outlet orifice located in the discharge outlet 40 of the hopper 12, as is known.

Referring to FIGS. 2 and 3, the drive assembly 16 includes a motor 42 and a drive shaft 45. In one embodiment, the motor 42 is located in a recess on the outside of the hopper 12 so as not to be damaged by the salt, or sand, etc. that is being spread. The shaft 44 of the motor 42 extends through an aperture in the wall of the hopper 12 and is coupled to the drive shaft 45 through a pulley/belt system 47, with an idler 48, located in the hopper 12. The drive shaft 45 can include projections to break up clumps as is known in the art. Alternatively, the spinner 14 can be configured to be rotated bi-directionally and to spread particulate matter aggressively regardless of the direction in which the spinner is being rotated. The spinner can have a T-type spinner flight.

In an alternative embodiment, the drive assembly can be a direct drive system with the drive shaft 45, on which the spinner 14 mounted, connected directly to the motor shaft 44. In such embodiment, the drive motor can be mounted within the hopper 12, located near the top of the hopper, with the motor shaft 44 extending coaxially with the drive shaft 45.

Figure 4:
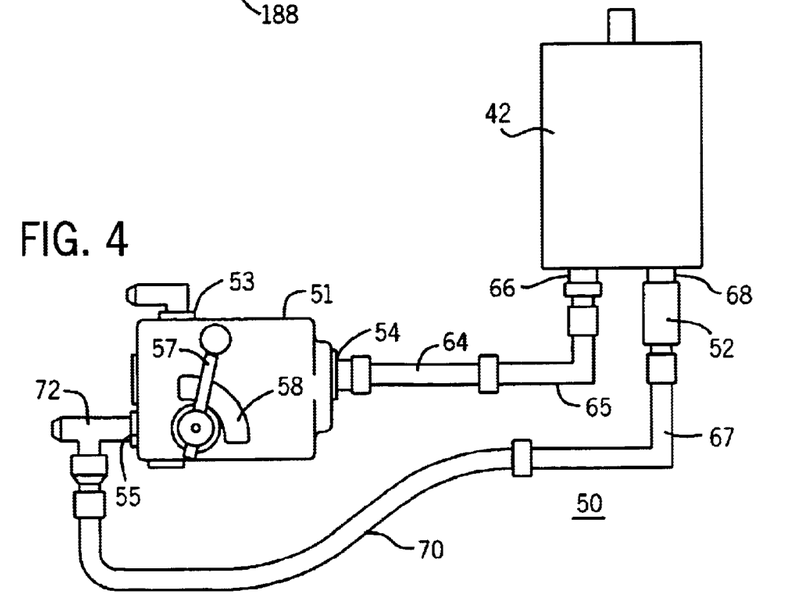
FIG. 4 is a simplified representation of the hydraulic components of the hopper spreader apparatus of FIG. 1.
Figures 7, 8:
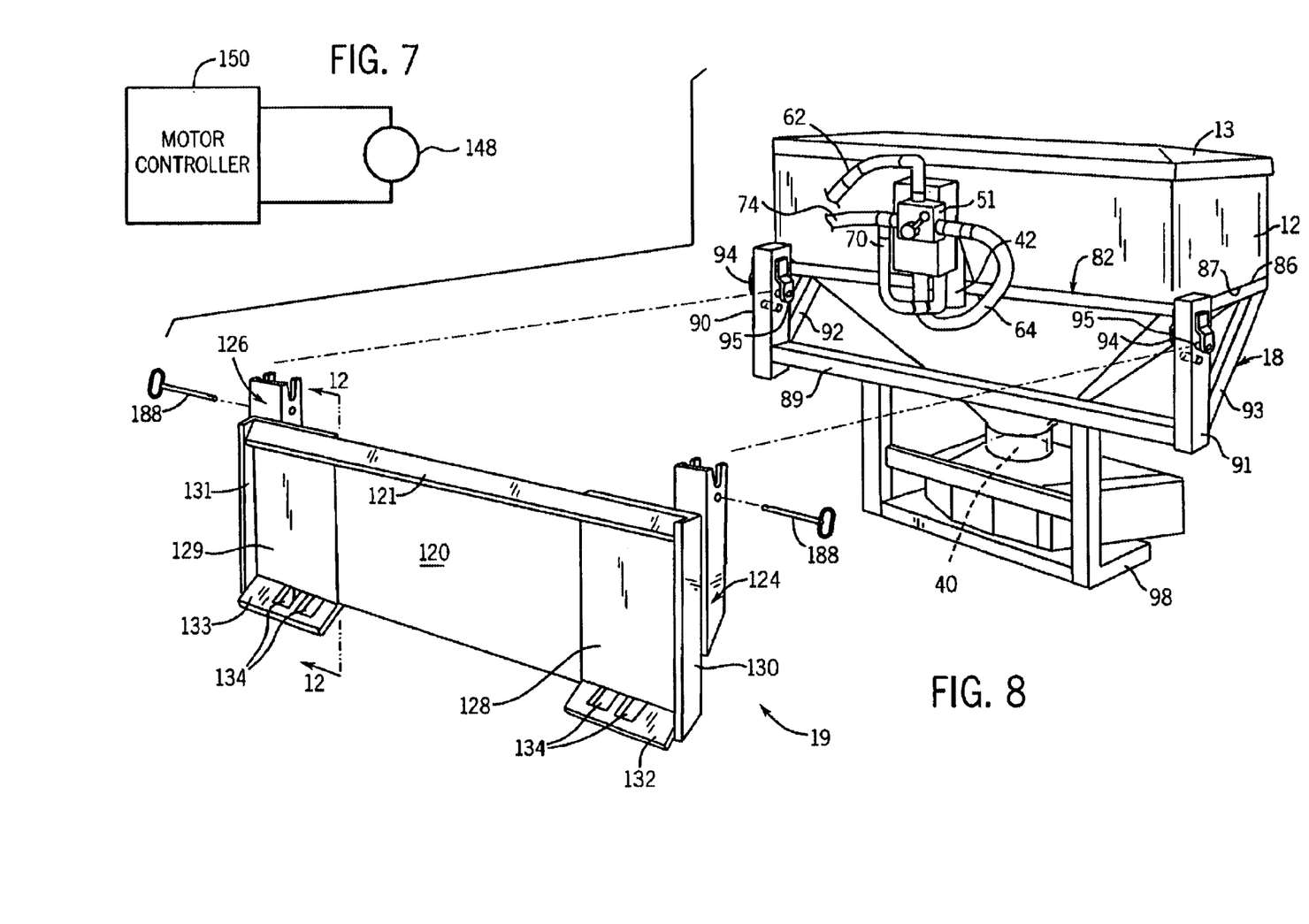
FIG. 7 is a simplified representation of a further embodiment of a drive mechanism which includes an electric motor and a motor controller for rotating the spinner of the hopper spreader apparatus.
FIG. 8 is a view similar to that of FIG. 2 with the mounting adapter of the hopper spreader apparatus exploded away from the support frame of the hopper spreader apparatus.

In accordance with one preferred embodiment, the motor 42 of the hopper spreader apparatus 10 is a hydraulic motor, the operation of which is controlled by a hydraulic control circuit 50, illustrated in FIG. 4. However, the motor can be an electric motor 148 the operation of which is controlled by an electrical drive circuit 150 as shown in FIG. 7. The shaft of the motor 148 can be coupled to the drive shaft 45 either directly or through a pulley/belt system. The electric motor 148 can be a reversible motor, allowing the spinner 14 to be rotated either clockwise or counter clockwise.

Referring to FIG. 3, the pulley/belt system 47 allows a degree of "slippage" between the motor shaft 44 and the drive shaft 45 if the drive shaft 45 should become jammed due to a foreign object inadvertently being introduced into the hopper 12, or to clumping of the particulate material being spread, thereby minimizing the chance that the motor 42 could be damaged. However, in the event of an overload condition, the hydraulic motor 42 merely holds in a position to which it has been driven, in contrast to an electrical motor, the windings of which could burn out if the motor shaft becomes stalled while the motor windings continue to be energized. However, hydraulic motors having higher or lower maximum hydraulic pressure ratings and which deliver higher or lower torque can be used.

In one embodiment, the hydraulic motor 42 rotates the drive shaft 45 at speeds up to 4000 revolutions per minute (rpm). The hydraulic motor 42 delivers a torque of about 3.0 inch-lbs/100 pounds per square inch (psi). Displacement is 0.00088 or 0.203 cubic inches. The rated maximum hydraulic pressure for the hydraulic motor can be about 1500 psi. One hydraulic motor suitable for this application is the model DM4 which is commercially available from Delta, located in Rockford, Ill.

In one embodiment, the speed of the hydraulic motor 42 is adjusted manually at the hopper 12 by a volume flow control mechanism as will be shown. However, a speed control device can be provided in the cab 28 to allow the speed of the hydraulic motor 42 to be controlled from the cab 28 of the vehicle 20. Referring to FIGS. 2 and 4, the operation of the hydraulic motor 42 is controlled by a hydraulic control circuit 50. In one embodiment, the hydraulic control circuit 50 includes a flow controller 51 and a check valve 52. The flow controller 51 has an inlet flow port 53, a controlled flow port 54 and an excess flow port 55. The inlet flow port 53 is connected through a supply hydraulic line or hose 62 (FIG. 2) to a source of hydraulic fluid under pressure. The controlled flow port 54 is connected through a motor feed hose 64 and an elbow 65 to an inlet port 66 of the hydraulic motor. The outlet port 68 of the hydraulic motor is connected to an input of the check valve 52, the output of which is connected through an elbow 67, a hydraulic motor return line or hose 70 and a tee connector 72 to a hydraulic fluid reservoir. The excess flow port 55 of the flow controller 51 also is connected to the hydraulic fluid reservoir through the tee connector 72 which is connected to a main return hydraulic line or hose 74 as shown in FIG. 2.

Figure 5:
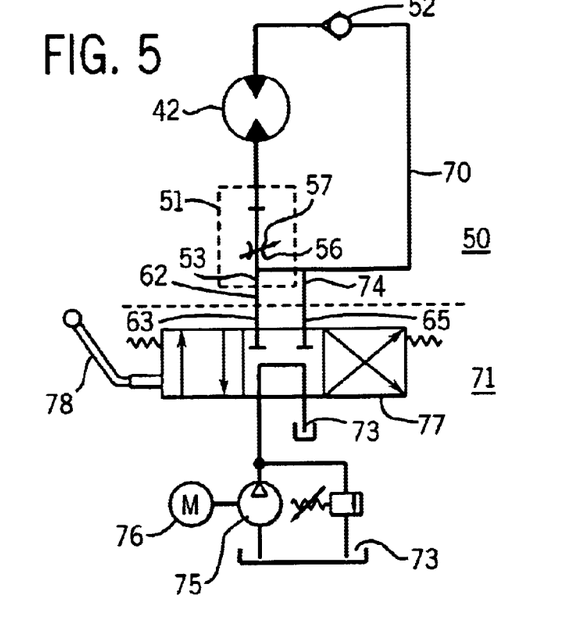
FIG. 5 is a schematic diagram of the hydraulic circuit of the hopper spreader apparatus of FIG. 1 and a portion of the hydraulic system of the skid steer loader unit.

Referring also to FIG. 5, in one preferred embodiment, the source of pressurized hydraulic fluid is provided by the hydraulic system 71 of the skid steer loader unit 20. In such embodiment, the inlet flow port 53 is connected through a supply hydraulic hose 62 to an auxiliary outlet 63 (FIG. 5) of the hydraulic system 71 of the skid steer loader unit 20. The main return hydraulic hose 74, and thus the hydraulic motor return hose 70 which is connected to the main return hydraulic hose 74, is connected to an auxiliary inlet 65 of the hydraulic system 71 of the skid steer loader, which is communicated with the hydraulic fluid reservoir 73 of the hydraulic system 73 of the skid steer loader unit 20.

The hydraulic system 71 of the skid steer loader unit further includes a pump 75 driven by a motor 76 to supply hydraulic fluid from hydraulic fluid reservoir 73 to a hydraulic actuator solenoid 77. The hydraulic actuator solenoid 77 is operable by a control knob 78 to extend and retract the hydraulic actuator 38 (FIG. 1) for positioning the mounting plate 36 (FIG. 1).

In one preferred embodiment, the flow controller 51 limits the flow of hydraulic fluid to the hydraulic motor by diverting hydraulic fluid not being used back to the reservoir 73. This avoids excessive pressure in the hydraulic lines which could result in damage to the hydraulic lines. This also minimizes heat build up in components of the hydraulic control circuit 50 and components of the hydraulic system 71 of the skid steer loader unit 20. However, the control of the flow rate of hydraulic fluid to the hydraulic motor can be accomplished without flow diversion, using one or more appropriately sized orifices connected in the hydraulic lines which connect the hydraulic motor to the hydraulic system 71 of the skid steer loader unit and/or using non-flow diverting devices.

The flow controller 51 adapts the flow rate of the hydraulic fluid supplied to the hydraulic motor 42 by the hydraulic system 71 of the skid steer loader 20 to the flow rate for the hydraulic motor 42, returning excess hydraulic fluid to the hydraulic fluid reservoir 73. In one embodiment, the flow controller 51 decreases the flow rate to the hydraulic motor 42 to about 1.5 gallons per minute (gpm) from the 30 gpm flow rate that is available from the hydraulic system 71 of the skid steer loader unit 20. The flow controller 51 divides the input flow, supplying 1.5 gpm to the hydraulic motor 42 and returning the remainder of the hydraulic fluid back to reservoir on the skid steer loader unit 20. The flow controller 51 limits the maximum pressure to 1500 psi.

Referring to FIGS. 4 and 5, in one embodiment, the flow controller 51 is a full range pressure compensating variable flow control valve. The flow controller 51 includes a volume flow control mechanism including a variable orifice 56 and a volume adjustment lever 57 which is movable to change the speed of the hydraulic motor 42 by changing the flow rate to the hydraulic motor. The flow controller 51 includes a control dial 58 which can include suitable indicia indicative of the flow rate to and/or the speed of the hydraulic motor 42.

The flow controller 51 includes a spring loaded metering spool or cartridge valve. Rotating the volume adjustment lever 57 changes the size of orifice 56 of the valve, varying the pressure drop across a spool of the spool valve. A dash pot (not shown) dampens the spool movement to eliminate spool hunting so that the output flow provided by the flow controller 51 is smooth and constant regardless of the pressure on the controlled flow port and the excess flow port. One flow controller suitable for this application is the FC-series flow control valve which is available from Brand Hydraulics, located in Omaha Neb., 68105.

Figure 6:
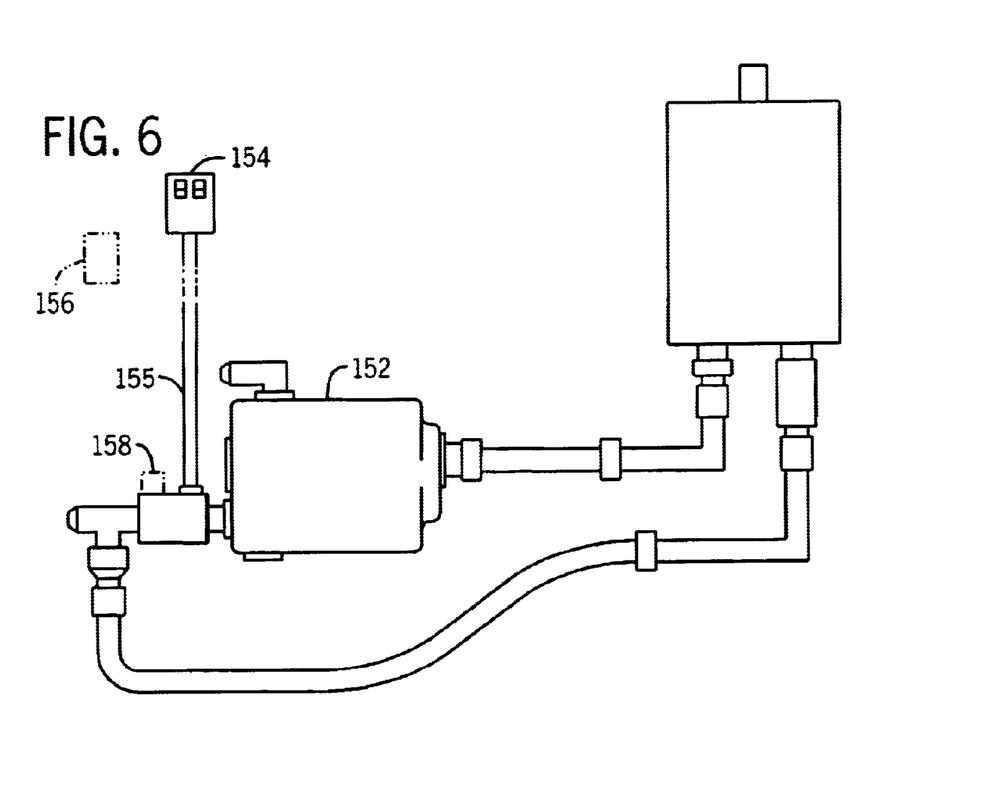
FIG. 6 is a simplified representation of the hydraulic components of the hopper spreader apparatus in accordance with a further embodiment which includes an electrically operated flow controller.

Referring to FIG. 6, in another embodiment, the flow controller 152 is electrically controlled. The electrically controlled flow controller 152 allows the adjustment of the flow control to be made from a location remote to the flow controller. For example, the electrically controlled flow controller 152 can be operated by way of a control unit 154 located within the cab 28 of the vehicle (FIG. 1) or from a location outside of the vehicle. The control unit 154 can be electrically connected to the flow controller by an electrical cable 155, or can be a wireless control which can include a fixed or portable transmitter, represented by dashed box 156 located or locatable at the remote location, and a receiver, represented by dashed box 158, mounted to or in the proximity of the electrically controlled flow controller and electrically coupled to the flow controller. One electrically adjustable flow controller suitable for this application is the EFC-series flow control valve which is available from Brand Hydraulics, located in Omaha Neb., 68105.

The flow out of the controlled flow port 54 is proportional to the orifice diameter which can operated between a completely closed position and a wide open position. The sum of the controlled flow through the controlled flow port 54 and the excess flow through the excess flow port 55 is equal the inlet flow through the inlet flow port 53. As the controlled flow increases, the excess flow decreases. Both outlet flows are pressure compensated by the spool valve of the flow controller 51 that maintains a constant flow while adjusting for pressure.

The check valve 52 prevents the hydraulic motor 42 from running in reverse, providing uni-directional operation of the hydraulic motor. If the direction of flow of hydraulic fluid were reversed in the hydraulic control circuit shown in FIG. 5, reversing the direction of operation of the motor, the hydraulic motor could over-speed because there would be no regulation of hydraulic fluid flow to the hydraulic motor. In one embodiment, the check valve 52 is located in series with the hydraulic fluid return line 70 for the hydraulic motor. It is pointed out that the check valve 52 can be located in the main hydraulic fluid return line 74, but the elbow 67, the tee connector 72 and other adapters, connected in the hydraulic fluid main return line would have to be much larger because of the larger flow rate.

With modification, the hydraulic circuit shown in FIG. 5 can provide for bi-directional operation of the hydraulic motor. For example, a volume flow control mechanism, similar to the volume flow control mechanism of the flow controller 51, can be substituted for the check valve 52 in the hydraulic return line. This arrangement permits the hydraulic motor to drive the spinner in either direction for spreading particulate material. In addition, the direction of rotation of the spinner can be reversed to unjam the spinner or to unclog the discharge opening or outlet 40 of the hopper 12.

Referring to FIGS. 3, 8, 9 and 10, the details of the frame assembly 17 are now described. The support frame 18 includes a rear cross member 82 and a front cross member 84 which are connected together by a pair of horizontal side members 85 and 86, forming an open frame which receives and supports the hopper 12. The hopper 12 includes a lower shoulder 87, extending around the periphery of the hopper 12, which sits on upper surface 88 (FIG. 3) of the support frame 18.

The support frame 18 further includes a lower cross member 89 which is connected to the rear cross member 82 by a pair of vertical side members 90 and 91. A pair of bracing members 92 and 93 extend at angle between the lower ends of the vertical side members 90 and 91 and the forward ends of the horizontal side members 85 and 86. The cross members 82, 84 and 89, the side members 85, 86, 90 and 91, and the bracing members 92 and 93 can be iron or steel bars, angle iron, or any other rigid material. Each vertical side member 90 and 91, such as side member 91, includes a pair of tub brackets 94 and 95. A support structure 98 for the bottom of the hopper 12 and the spinner 14 is connected to the lower support member 89.

Figure 11:
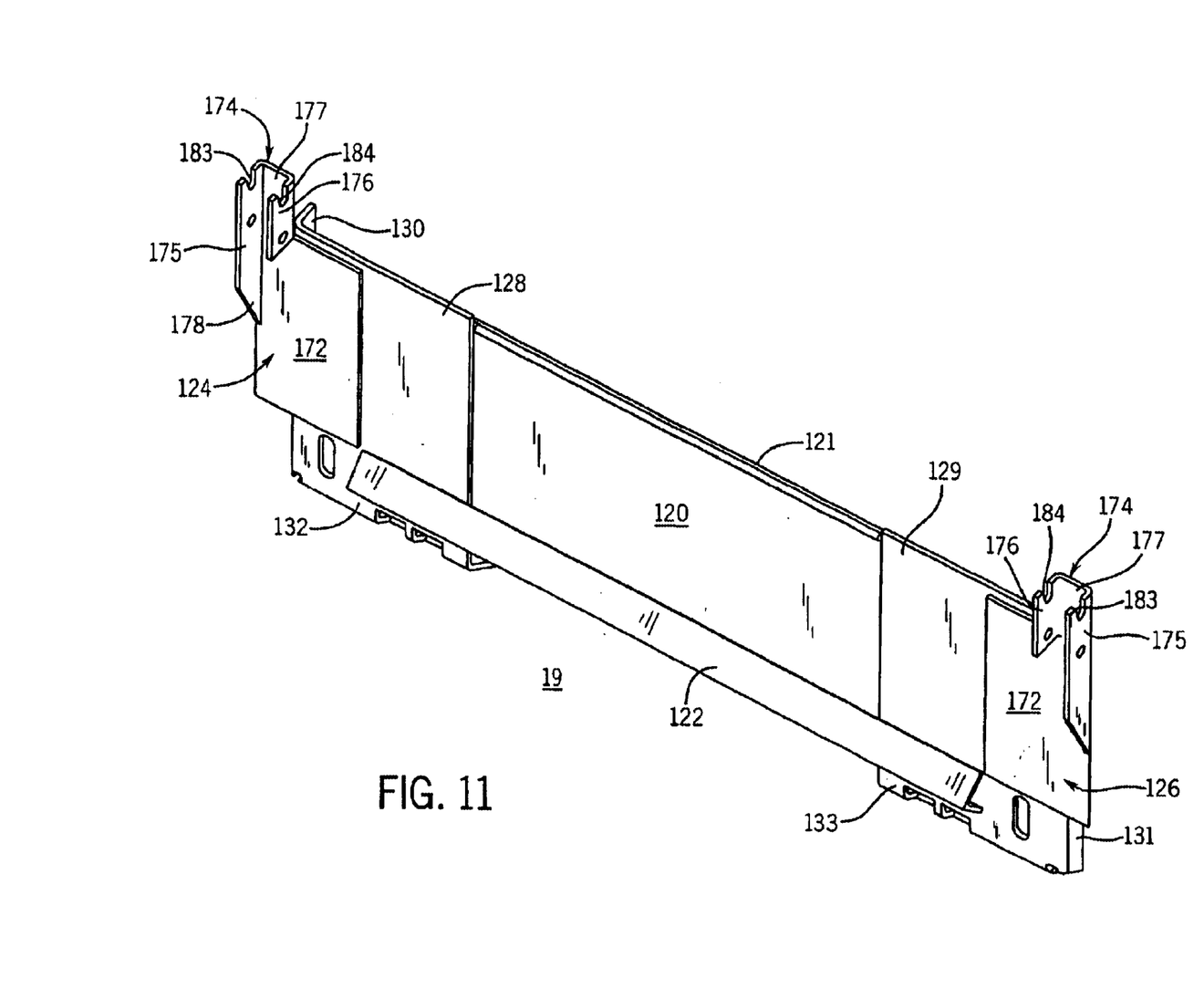
FIG. 11 is a rear isometric view of the mounting adapter shown in FIGS. 9 and 10.

Referring to FIGS. 8 and 11, the mounting adapter 19 includes a panel 120, an upper cross member 121, a center support angle member 122, a left mounting bracket 124, and a right mounting bracket 126.

In one embodiment, the panel 120 is generally rectangular in shape and includes a left panel side portion 128 and a right panel side portion 129 on which are mounted the left mounting bracket 124 and the right mounting bracket 126, respectively. The left panel side portion 128 and a right panel side portion 129 are slightly thicker than the center portion of the panel 120. In addition, the outer ends of the left and right panel side portions 128 and 129 are bent over forming left and right end members 130 and 131, respectively, for the panel 120. Also, the left and right panel side portions 128 and 129 include rearwardly directed bottom ends 132 and 133, respectively, each of which includes one or more apertures 134.

Figures 9, 10:
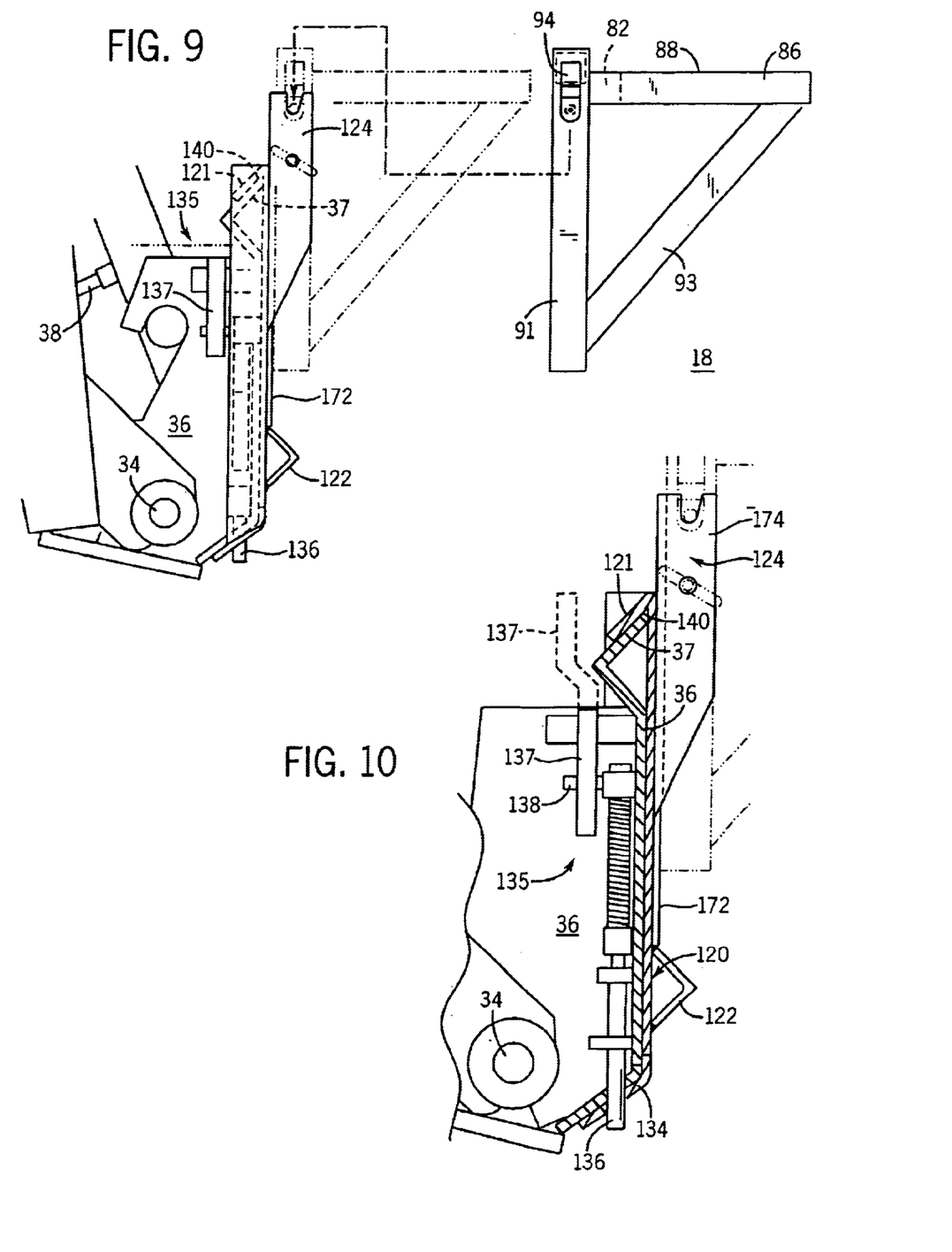
FIG. 9 is a side section view illustrating the support frame and the mounting adapter of the hopper spreader apparatus of FIG. 1, with the support frame shown separately from the mounting adapter and shown in phantom mounted on the mounting adapter.
FIG. 10 is an enlarged, fragmentary view, partially in section, showing the mounting adapter of the hopper spreader apparatus mounted to the mounting plate of the skid steer unit.

As shown in FIG. 10, for example, the apertures 134 receive locking pins 136 of one or more quick release mechanisms 135 of the skid steer loader unit 20 for locking the mounting adapter 19, and the hopper 12 when mounted to the mounting adapter 19. In one embodiment, the mounting plate 36 of the skid steer unit 20 includes two quick release mechanisms, which are located on opposite sides of the mounting plate 36 adjacent to the bottom ends 132 and 133. Each quick release mechanism includes one pin 136 which is positioned to be received in one of the apertures 134 when the quick release mechanism is engaged. Each of the two quick release mechanisms 135 can be conventional. The pin 136 of one quick release mechanism 135 is disposed to be extended into and retracted out of one of the apertures 134 of bottom end 132 by a mechanism, including a lever 137 which is adapted to pivot about a pin 138 when the lever 137 is manually rotated by an operator between a retracted position, shown in phantom, in which the pin 138 is retracted out of the aperture 134, and an operated position, in which lever 137 is shown in solid line, in which the pin 138 is extended into the aperture 134. The other quick release mechanism (not shown) includes a pin which is disposed to be extended into and retracted out of one of the apertures 134 of bottom end 133.

Figures 12, 13, 14:
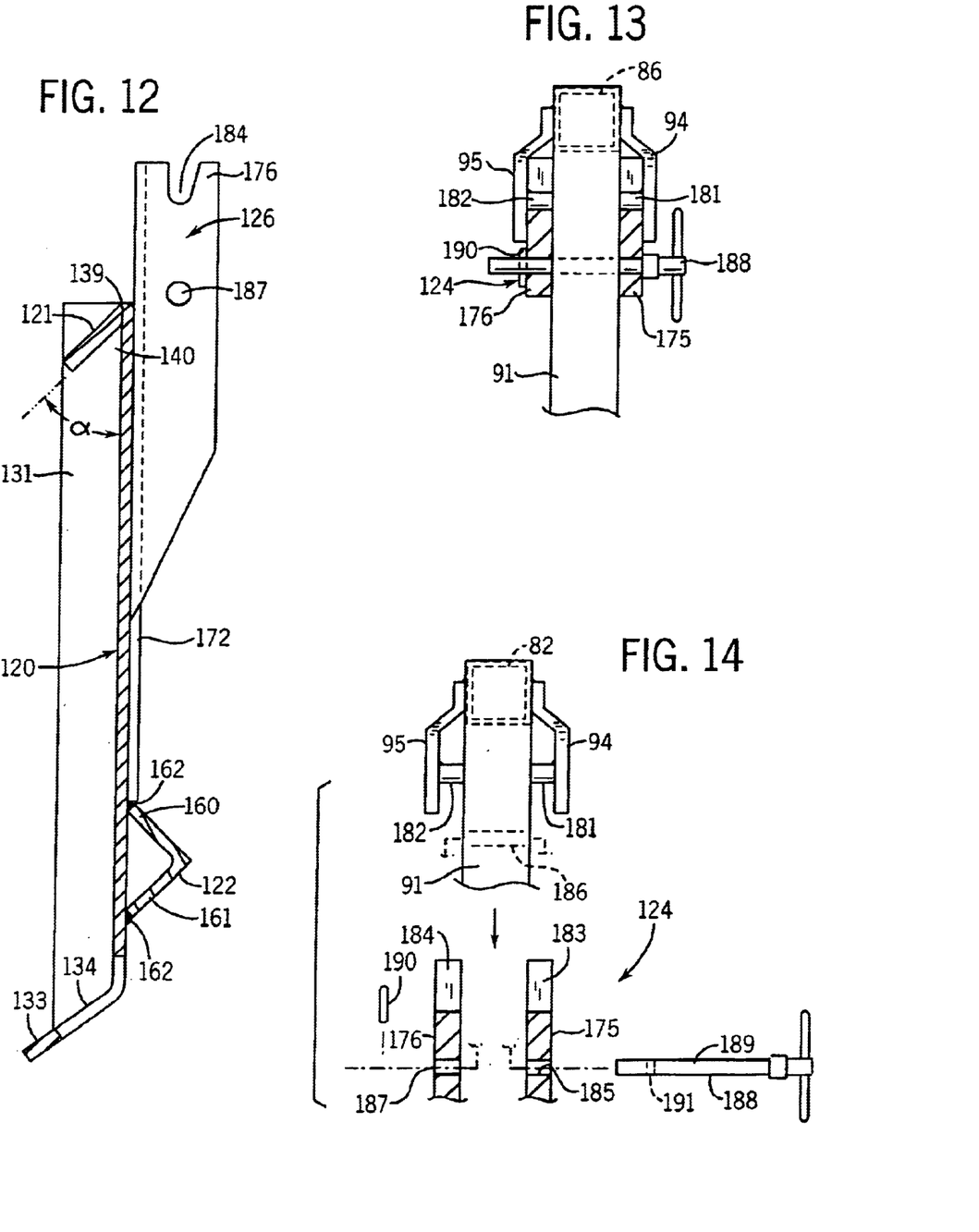
FIG. 12 is a vertical section view taken along the line 12—12 of FIG. 8.
FIG. 13 is a fragmentary view, partially in section showing details of one of the mounting brackets and the tub brackets by which the support frame is mounted on the mounting adapter.
FIG. 14 is a view similar to that of FIG. 13 and with the support frame shown exploded relative to the mounting adapter.

Referring to FIGS. 8, 10, 11 and 12, in one embodiment, the upper cross member 121 is a separate element that extends along the panel 1210 at or near the upper edge of the panel 120. The upper cross member 121 is secured to the panel 120 in a suitable manner, such as by welding, as indicated at 139 (FIG. 12). However, the upper cross member 121 can be integral with the panel 120 and formed by bending over the upper edge of the panel 120, for example.

The upper cross member 121 extends at an angle α relative to the upper edge of the panel 120, forming an inverted V-shaped groove or channel 140 at the top edge of the panel 120. In one embodiment, the angle (c is an acute angle in the range of about 35° to 55°, and preferably about 45°. The channel 140 is adapted to receive projecting edges, such as projecting edge 37, of the mounting plate 36 of the skid steer loader unit 20 as shown in FIG. 10, for example. In one embodiment, the projecting edges, such as projecting edge 37, are located at opposite sides of the tool mounting plate 36 and extend the length of the panel side portions 128 and 129, for example. However, the projecting edges of the mounting plate 36 can be a single edge that extends substantially the entire length of the mounting plate 36 and the panel 120 of the mounting adapter 19.

Referring to FIGS. 10, 11 and 12, the center support angle member 122 extends along the length of the panel 120 near the bottom of the panel. In one embodiment, the center support angle member 122 is a right angle member that has both of its edges 160 and 161 secured to the surface of the panel 120 in a suitable manner, such by welding as indicated at 162. However, the center support angle member can be formed as a longitudinal rib, integral with the panel 120. The center support angle member provides stabilization of the panel at the center and bottom of the panel 120.

Referring to FIGS. 8, 10 and 11, the mounting brackets 124 and 126 are similar to one another, but the mounting bracket 126 is a mirror image of mounting bracket 124. Accordingly, only mounting bracket 124 is described in detail and like elements of the mounting brackets 124 and 126 have been given the same reference numbers.

In one embodiment, each of the mounting brackets, such as the left mounting bracket 124, includes a generally flat plate-like base portion 172 and a mounting bracket portion 174 which is located at the upper, outer corner of the base portion. The base portion 172 is generally rectangular in shape and extends from near the top of the left panel side portion 128 to the bottom of the left panel side portion 128. The base portion 172 is about one-half the width of the left panel side portion 124.

The mounting bracket portion 174 is generally U-shaped and includes first and second parallel extending outer and inner plate portions 175 and 176, which extend in parallel, spaced relation and substantially perpendicular to the base portion 172 and are interconnected by an upwardly extending portion 177 of the base portion 172. The outer plate portion 175 is longer than the inner plate portion 176, defining a downwardly extending, generally trapezoidal shaped extension 178 that is integral with or connected to the base portion 172.

Referring also to FIGS. 13 and 14, the outer and inner plate portions 175 and 176 include notches 183 and 184, respectively, which define a saddle for the mounting bracket portion 174. The inner and outer plate portions 175 and 176 also include aligned apertures 185 and 187 for receiving the shaft 189 of the locking pin 188 as shown in FIG. 14, for example. The mounting bracket 124 is secured to the panel 120 near the left side thereof in a suitable manner, preferably by welding. Similarly, the right mounting bracket 126 can be secured to the panel 120 near the right side thereof in any suitable manner and preferably by welding.

As is stated above, the mounting brackets 124, 126, together with the tub brackets 94, 95 and locking pins 188, form a quick attach mechanism for removably coupling the mounting adapter 19 to the support frame 18. Referring to FIGS. 2, 8, 11, 12 and 14, the pair of tub brackets 94 and 95, such as the tub brackets disposed on side member 90, each include rods 181 and 182, respectively, which are received in the saddles 183 and 184 of each of the associated mounting bracket 124. The side members, such as side member 91, and the associated mounting bracket 124, include aligned apertures 185, 186 and 187 through which extend the shaft 189 of locking pin 188. The locking pin 188 is maintained in place by a removable pin 190 which extends through an aperture 191 in the shaft of the locking pin 188.

With reference to FIGS. 8, 9, 12 and 13, to mount the hopper spreader apparatus 10 on the skid steer loader unit 20, the mounting adapter 19 is attached to the hopper support frame 18 by the quick attach mechanism. To this end, the mounting adapter 19 is positioned with the saddles 183 and 184 of the mounting brackets 124 and 126 receiving the rods 181 and 182 of the tub brackets 94 and 95, and the locking pins 188 then are inserted to lock the mounting adapter 19 to the support frame 18. The hopper 12 can be filled prior to or subsequent to mounting on the skid steer loader unit 20.

Referring to FIGS. 1, 2 and 10, then, the vehicle 20 is maneuvered into position with the mounting plate 36 of the vehicle positioned with its projecting upper edge or edges 37 underlying the channel 140 of the mounting adapter 19 on both sides of the panel 120. Then, the mounting plate 36 of the skid steer loader unit 20 is raised by operating the actuator 38 (FIG. 1) moving the projecting edge or edges 37 into engagement with the channel 140 of the mounting panel 120. Then, the quick release mechanisms 135 are operated, rotating the lever 137 to cause the pins 136 to drop down through the apertures 134 in the lower edges 132 and 133 of the panel 120 to lock the hopper spreader apparatus 10 to the mounting plate 36 of the skid steer loader unit 20. The pins 136, together with the mating surfaces 37 and 140, connect the mounting adapter 19, and the hopper 12 attached thereto, firmly, but releaseably to the skid steer loader unit 20. Referring also to FIG. 5, then, the supply hydraulic hose 62 and the main hydraulic return hose 74 are connected to the auxiliary inputs 63 and 65, respectively, of the hydraulic system of the skid steer loader unit 20. In use, the speed of rotation of the hydraulic motor 42, and thus, the speed at which the spinner 14 is rotated, can be adjusted by adjusting the position of the volume adjustment lever 57 (FIG. 4).

While preferred embodiments have been illustrated and described, it should be understood that changes and modifications can be made thereto without departing from the invention in its broadest aspects. Various features of the invention are defined in the following claims.

What is claimed is:

1. A hopper spreader apparatus for dispensing dry, free flow material, said hopper spreader apparatus adapted for mounting on a skid steer vehicle, the vehicle having a mounting plate which is movably supported at the front end of the vehicle, and a hydraulic system for supplying hydraulic fluid at a first flow rate, said hopper spreader apparatus comprising:

a hopper for containing the dry, free flow material, said hopper having a discharge outlet for dispensing the material;

a spinner located adjacent to the discharge outlet for receiving free flow material discharged from the hopper and spreading the material over a large distribution area;

a mounting assembly for removably mounting the hopper to the mounting plate of the skid steer vehicle, the mounting assembly including a mounting adapter and a plurality of quick release fasteners engaging the hopper to removably secure the mounting adapter to the hopper, and the mounting adapter engaging a quick release mechanism of the skid steer vehicle to removably secure the mounting adapter to the mounting plate of the skid steer vehicle, the quick release mechanism and the quick release fasteners allowing the mounting adapter to be separated from the mounting plate of the skid steer vehicle and the hopper;

a drive mechanism including a hydraulic motor coupled to the spinner for rotating the spinner to distribute material discharged from the hopper; and a hydraulic circuit including a hydraulic flow controller interposed between an outlet port of the hydraulic system of the vehicle and an inlet port of the hydraulic motor for supplying hydraulic fluid from the hydraulic system to the hydraulic motor at a second flow rate.

2. The hopper spreader apparatus according to claim 1, wherein the hydraulic circuit includes a check valve for limiting the hydraulic motor to uni-directional operation.

3. The hopper spreader apparatus according to claim 2, wherein the hydraulic motor includes a hydraulic fluid supply port and a hydraulic fluid return port for hydraulic fluid, and wherein the check valve is connected in a hydraulic fluid return line.

4. The hopper spreader apparatus according to claim 1, wherein the hydraulic flow controller includes a flow control device which is adjustable for varying the flow rate of hydraulic fluid supplied to the hydraulic motor, thereby varying the operating speed of the hydraulic motor.

5. The hopper spreader apparatus according to claim 4, wherein the flow controller diverts a portion of the hydraulic fluid away from the hydraulic motor, said diverted portion of hydraulic fluid being returned to a hydraulic fluid reservoir.

6. The hopper spreader apparatus according to claim 4, wherein the flow control device comprises an orifice.

7. The hopper spreader apparatus according to claim 4, wherein the flow control device is electrically operable.

8. The hopper spreader apparatus according to claim 4, wherein the flow controller includes a control coupled to the flow control device.

9. The hopper spreader apparatus according to claim 8, wherein the control is manually operable and includes a lever movable to select a flow rate for hydraulic fluid supplied to the hydraulic motor.

10. The hopper spreader apparatus according to claim 9, wherein the manually operable control includes a dial for indicating the flow rate for hydraulic fluid being supplied to the hydraulic motor.

11. A hopper spreader apparatus for dispensing dry, free flow material, said hopper spreader apparatus adapted for mounting on a vehicle having a hydraulic system for supplying hydraulic fluid, said hopper spreader apparatus comprising:

a hopper for containing the dry, free flow material, said hopper having a discharge outlet for dispensing the material;

a spinner located adjacent to the discharge outlet for receiving free flow material discharged from the hopper and spreading the material over a large distribution area;

a drive mechanism including a hydraulic motor coupled to the spinner for rotating the spinner to distribute free flow material discharged from the hopper; and a hydraulic circuit for supplying hydraulic fluid to the hydraulic motor, wherein the hydraulic motor includes a hydraulic fluid supply port and a hydraulic fluid return port for hydraulic fluid, the hydraulic circuit including a check valve for limiting the hydraulic motor to unidirectional operation and wherein the check valve is interposed between the hydraulic fluid return port and a main hydraulic fluid return line.

12. A hopper spreader apparatus for dispensing dry, free flow material, said hopper spreader apparatus adapted for mounting on a skid steer vehicle, the vehicle having a mounting plate which is movably supported at the front of the vehicle, and a hydraulic system for moving the mounting plate, said hopper spreader apparatus comprising:

a hopper for containing the dry, free flow material, said hopper having a discharge outlet for discharging the free flow material;

a spinner located adjacent to the discharge outlet for receiving free flow material discharged from the hopper and spreading the material over a large distribution area;

a drive mechanism including a motor coupled to the spinner for rotating the spinner to distribute free flow material dispensed from the hopper, and a motor control circuit for controlling the speed of the motor; and, a mounting assembly for removably mounting the hopper to the mounting plate, the mounting assembly including a mounting adapter and a plurality of quick release fasteners, the quick release fasteners engaging the hopper to removably secure the mounting adapter to the hopper, and the mounting adapter engaged by a quick release mechanism of the skid steer vehicle to removably secure the mounting adapter to the mounting plate of the skid steer vehicle, the quick release mechanism and the quick release fasteners allowing the mounting adapter to be separated from the mounting plate of the skid steer vehicle and the hopper.

13. The hopper spreader apparatus according to claim 12, wherein the motor is an electric motor.

14. The hopper spreader apparatus according to claim 12, wherein the motor is a hydraulic motor.

15. The hopper spreader apparatus according to claim 14, wherein the motor control circuit includes a hydraulic flow controller and a hydraulic circuit connecting the hydraulic motor to the hydraulic flow controller, the hydraulic flow controller matching the flow rate of hydraulic fluid supplied by the source of hydraulic fluid with a hydraulic fluid flow rate for the hydraulic motor.

16. The hopper spreader apparatus according to claim 15, wherein the hydraulic flow controller controls the flow rate of hydraulic fluid supplied to the hydraulic motor, thereby controlling the speed of the hydraulic motor.

17. The hopper spreader apparatus according to claim 15, wherein the hydraulic circuit includes a check valve for limiting the hydraulic motor to uni-directional operation.

18. The hopper spreader apparatus according to claim 17, wherein the check valve is connected in a hydraulic fluid return line for the hydraulic motor.

19. The hopper spreader apparatus according to claim 12, wherein the mounting assembly includes a support frame secured to the hopper supporting the hopper.

20. A hopper spreader apparatus for dispensing dry, free flow material, said hopper spreader apparatus adapted for mounting on a skid steer vehicle having a hydraulically operated vertical lift mechanism including a pair of mounting arms, and a mounting plate fixed to the mounting arms; said hopper spreader apparatus comprising:

a hopper for containing the dry, free flow material, said hopper having a discharge outlet for discharging the free flow material;

a spinner located adjacent to the discharge outlet for receiving free flow material discharged from the hopper and spreading the material over a large distribution area;

a drive mechanism including a hydraulic motor coupled to the spinner for rotating the spinner for distributing free flow material discharged from the hopper;

a hydraulic circuit adapted to be coupled to a hydraulic system of the vehicle, the hydraulic circuit including a hydraulic flow controller for adapting the flow rate of the hydraulic system to a flow rate of the hydraulic motor; and a mounting assembly for removably mounting the hopper to the mounting plate of the skid steer vehicle, the mounting assembly including a mounting adapter and a plurality of quick release fasteners, the quick release fasteners engaging the hopper to removably secure the mounting adapter to the hopper, and the mounting adapter engaged by a quick release mechanism of the skid steer vehicle to removably secure the mounting adapter to the mounting plate of the skid steer vehicle, the quick release mechanism and the quick release fasteners allowing the mounting adapter to be separated from the mounting plate of the skid steer vehicle and the hopper.

21. The hopper spreader apparatus according to claim 20, wherein the flow controller is interposed between an outlet port of the hydraulic system of the vehicle and an inlet port of the hydraulic motor.

22. The hopper spreader apparatus according to claim 21, wherein the flow controller controls the speed of the hydraulic motor.

23. The hopper spreader apparatus according to claim 21, wherein the hydraulic circuit includes a check valve for limiting the hydraulic motor to uni-directional operation.

24. The hopper spreader apparatus according to claim 23, wherein the check valve is connected in a hydraulic fluid return line for the hydraulic motor.

25. A hopper spreader apparatus for mounting on a skid steer loader unit having a vertical lift mechanism including lift arms extending forwardly of the vehicle, a mounting plate fixed to the lift arms, and a hydraulic system for raising and lowering the lift arms and the mounting plate fixed thereto, said hopper spreader apparatus comprising:

a hopper for containing the dry, free flow material, said hopper having a discharge outlet for discharging the free flow material;

a mounting assembly for removably mounting the hopper to the mounting plate of the skid steer loader unit, the mounting assembly including a mounting adapter and a plurality of quick release fasteners, the quick release fasteners engaging the hopper to removably secure the mounting adapter to the hopper, and the mounting adapter engaged by a quick release mechanism of the skid steer loader unit to removably secure the mounting adapter to the mounting plate of the skid steer loader unit, the quick release mechanism and the quick release fasteners allowing the mounting adapter to be separated from the mounting plate of the skid steer loader unit and the hopper.

26. The hopper spreader apparatus according to claim 25, wherein the mounting assembly includes a support frame supporting the hopper and a mounting adapter for removable attachment to the mounting plate and to the support frame for removably mounting the hopper to the mounting plate of the skid steer loader unit.

27. The combination comprising:
- a skid steer vehicle, said vehicle including
  - a pair of lift arms;
  - a mounting plate fixed to the lift arms; and
  - a hydraulic system coupled to the lift arms for raising and lowering the lift arms; and
- a hopper spreader apparatus for dispensing dry, free flow material; said hopper spreader apparatus including
  - a hopper for containing the dry, free flow material, said hopper having an outlet for discharging the free flow material;
  - a spinner located adjacent to the discharge outlet for receiving material as it is discharged from the hopper and spreading the material over a large distribution area;
  - a drive mechanism including a hydraulic motor coupled to the spinner for rotating the spinner for distributing free flow material dispensed from the hopper;
  - a hydraulic circuit including a hydraulic flow control unit interposed between an outlet port of the hydraulic system of the vehicle and an inlet port of the hydraulic motor for supplying hydraulic fluid to the hydraulic motor, the hydraulic flow control unit adapting the flow rate of the hydraulic system to a flow rate of the hydraulic motor;
  - a support frame supporting the hopper; and
  - an adapter assembly for removably attaching the hopper spreader apparatus to the skid steer vehicle, the adapter assembly including a mounting adapter and a plurality of quick release fasteners, the quick release fasteners engaging the hopper to removably secure the mounting adapter to the hopper, and the mounting adapter engaged by a quick release mechanism of the skid steer vehicle to removably secure the mounting adapter to the mounting plate of the skid steer vehicle, the quick release mechanism and the quick release fasteners allowing the mounting adapter to be separated from the mounting plate of the skid steer vehicle and the hopper.

* * * * *